(12) United States Patent
Inatomi (10) Patent No.: US 7,663,356 B2
(45) Date of Patent: Feb. 16, 2010

(54) CURRENT-CONTROLLED DC-DC CONVERTER CONTROL CIRCUIT, CURRENT-CONTROLLED DC-DC CONVERTER, AND METHOD FOR CONTROLLING CURRENT-CONTROLLED DC-DC CONVERTER

(75) Inventor: Koichi Inatomi, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 164 days.

(21) Appl. No.: 11/447,853

(22) Filed: Jun. 7, 2006

(65) Prior Publication Data

US 2007/0182396 A1    Aug. 9, 2007

(30) Foreign Application Priority Data

Feb. 7, 2006    (JP) .............................. 2006-030036

(51) Int. Cl.
  *G05F 1/00*    (2006.01)
(52) U.S. Cl. ..................... 323/283; 323/271; 323/282
(58) Field of Classification Search ................. 323/238, 323/244, 266, 271, 280, 281, 282, 283, 284, 323/288
  See application file for complete search history.

(56) References Cited

U.S. PATENT DOCUMENTS

| | | | |
|---|---|---|---|
| 4,238,708 A | * | 12/1980 | Kaneda ...................... 315/289 |
| 7,122,995 B2 | * | 10/2006 | Hasegawa et al. ........... 323/272 |
| 7,250,745 B2 | * | 7/2007 | Yasukouchi et al. ......... 323/284 |
| 2006/0238182 A1 | * | 10/2006 | Yoshino ...................... 323/282 |
| 2007/0090818 A1 | * | 4/2007 | Nishimori ................... 323/282 |
| 2007/0139023 A1 | * | 6/2007 | Hasegawa .................... 323/271 |

FOREIGN PATENT DOCUMENTS

JP    9-154275 A    6/1997

* cited by examiner

*Primary Examiner*—Edward Tso
*Assistant Examiner*—M'Baye Diao
(74) *Attorney, Agent, or Firm*—Fujitsu Patent Center (57) ABSTRACT

The invention includes a flip-flop circuit that controls a main switching element of a DC-DC converter by switching and an oscillation circuit that is connected to a set terminal of the flip-flop circuit and outputs an oscillation signal that gradually increases and decreases in oscillation frequency in accordance with an increase and decrease in output voltage value of the DC-DC converter when the DC-DC converter is in a transition state between a stop state and a steady operation state. In a process that the output voltage gradually rises and gradually falls, the oscillation frequency of the oscillation signal gradually rises and gradually falls, a time interval at which the main switching element is set into a conductive state is extended. No excess electric power is supplied to the output voltage, and the output voltage can be made to have a smooth ramp waveform.

20 Claims, 9 Drawing Sheets

CONCRETE EXAMPLE OF OSCILLATION CIRCUIT

FIG.1 CIRCUIT DIAGRAM OF FIRST EMBODIMENT

FIG.2 CONCRETE EXAMPLE OF OSCILLATION CIRCUIT

FIG.3 WAVEFORM CHART OF OSCILLATION SIGNAL CK

FIG.4

OSCILLATION FREQUENCY CHARACTERISTIC OF OSCILLATION CIRCUIT

FIG.6 CIRCUIT DIAGRAM OF ANOTHER DEVICE FOR CARRYING OUT RAMP CONTROL OF OUTPUT VOLTAGE

FIG.7 (PRIOR ART)
CIRCUIT DIAGRAM (VOLTAGE-CONTROLLED TYPE) OF BACKGROUND

FIG.8 (PRIOR ART)
CIRCUIT DIAGRAM (CURRENT-CONTROLLED TYPE) OF BACKGROUND ART

FIG.9 (PRIOR ART)
RAMP WAVEFORM OF OUTPUT WAVEFORM AT START-UP TIME IN FIG. 8

US 7,663,356 B2

CURRENT-CONTROLLED DC-DC CONVERTER CONTROL CIRCUIT, CURRENT-CONTROLLED DC-DC CONVERTER, AND METHOD FOR CONTROLLING CURRENT-CONTROLLED DC-DC CONVERTER

CROSS-REFERENCE TO RELATED APPLICATIONS

This application is based upon and claims the benefit of priority from each of the prior Japanese Patent Application No. 2006-030036 filed on Feb. 7, 2006, the entire contents of which are incorporated herein by reference.

BACKGROUND OF THE INVENTION

1. Field of the Invention

The present invention relates to control of a current-controlled DC-DC converter, and, more particularly to control of an output voltage at power-on and at power-off of a current-controlled DC-DC converter.

2. Description of Related Art

Japanese Unexamined Patent Publication No. H9-154275 discloses a DC-DC converter control circuit that aims to prevent dependence of output voltage rise/fall characteristics on a load at power-on/at power-off. This circuit is a voltage-controlled DC-DC converter control circuit.

Figure 7:
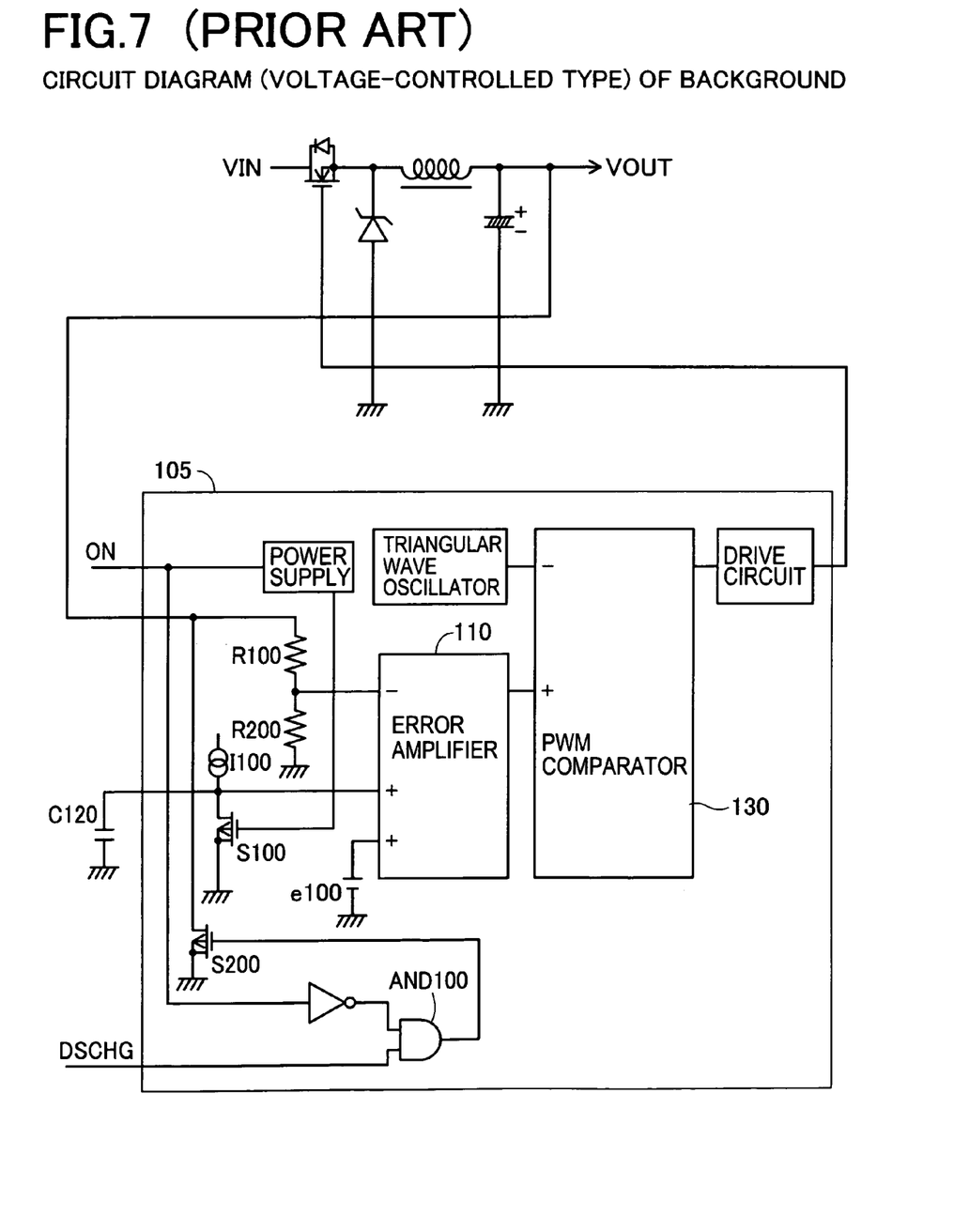
FIG. 7 is a circuit diagram (voltage-controlled type) of a background art.

As shown in FIG. 7, in a DC-DC control circuit 105, a constant current circuit I100 is a charging circuit that charges a soft-start capacitor C120 when a switching circuit S100 is off to raise potential of the soft-start capacitor C120 in a fixed time.

An error amplifier 110 amplifies a difference between a voltage divided by resistances R100 and R200 and a reference voltage value, or a lower voltage value of a reference voltage e100 and a voltage of the soft-start capacitor C120, and outputs the output to a PWM comparator 130.

As the constant current circuit I110 charges the soft-start capacitor C120, since control is carried out to gradually raise the reference voltage value that determines an output voltage of a DC-DC converter so as to output a regular voltage value after a fixed time, the output voltage of the DC-DC converter is controlled by a time constant determined by capacitance of the soft-start capacitor C120 without depending on a load.

An AND circuit AND 100 becomes high level as a result of a DSCHG signal that controls valid/invalid of a load capacitance discharge being high (valid) and an ON signal that controls ON/OFF at power-off becoming low.

A load capacitance discharge switching circuit S200 reaches an ON state when the AND circuit AND 100 is outputting a high level, short-circuits a section between the DC-DC converter output and ground, and forcedly discharges output load capacitance of the DC-DC converter without depending on a load of the DC-DC converter.

Figure 8:
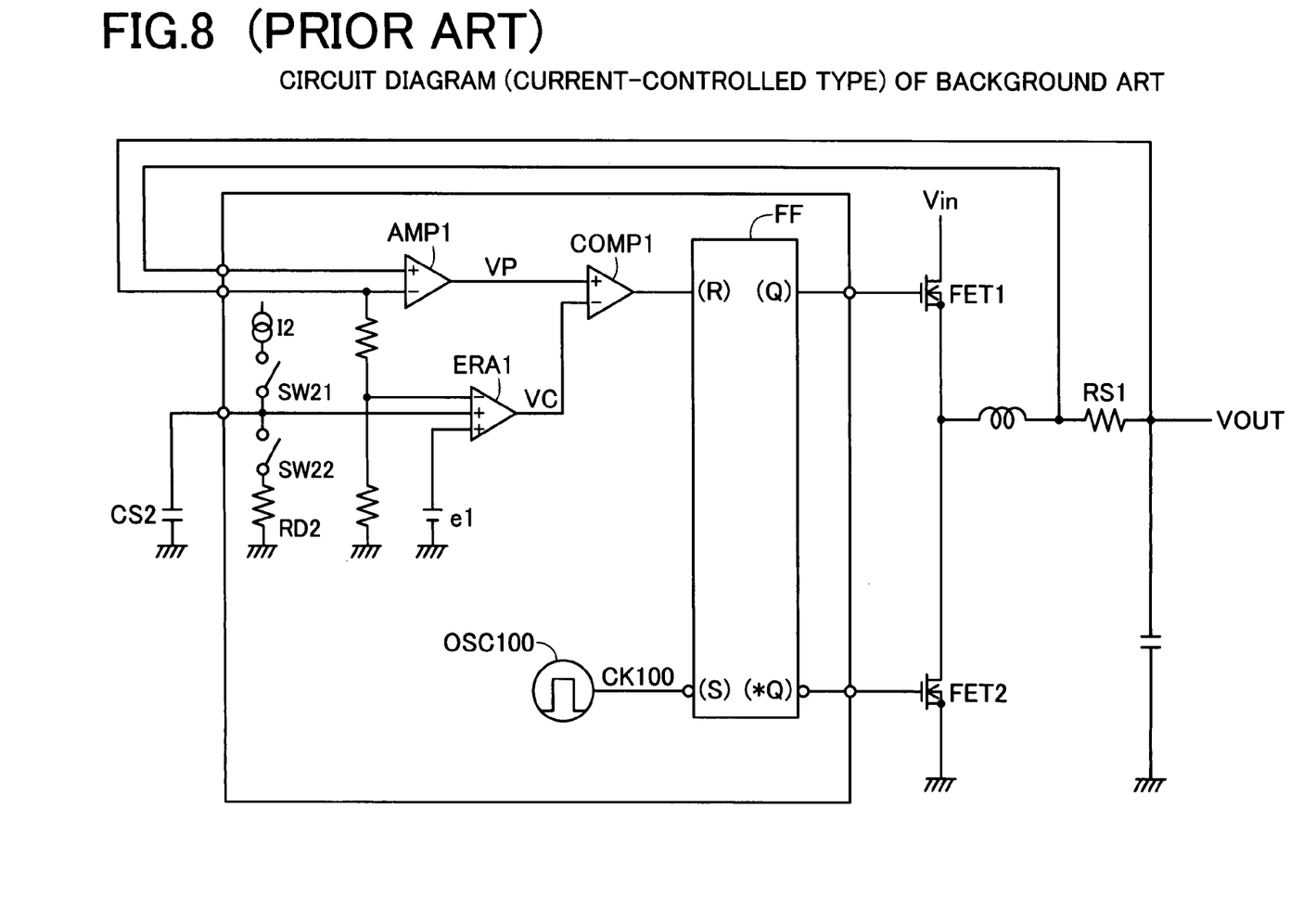
FIG. 8 is a circuit diagram (current-controlled type) of a background art.

In addition, a current-controlled DC-DC converter is shown in FIG. 8.

A voltage amplifier AMP1 amplifies a voltage drop caused by a current that flows to a current measuring resistance RS1 and outputs a voltage VP proportional to the current that flows to the current measuring resistance RS1.

An error amplifier ERA1 amplifies a difference between a lower one of the voltages applied to two noninverting input terminals and a voltage applied to an inverting input terminal and outputs a voltage VC.

An oscillator OSC 100 generates a pulse at a fixed frequency to periodically set a flip-flop circuit FF. When the flip-flop circuit FF is set, a MOS transistor FET1 being a main switching transistor is turned on and a MOS transistor FET2 being a synchronous rectification switch is turned off.

When the output VP of the voltage amplifier AMP1 becomes greater than the output VC of the error amplifier ERA1, a voltage comparator COMP1 resets the flip-flop circuit FF to turn off the MOS transistor FET1.

A switching circuit SW21 is a circuit to connect a constant current circuit I2 to a soft-start capacitor CS2, and a switching circuit SW22 is a circuit to connect a discharge resistance RD2 to the soft-start capacitor CS2.

Similar to the case of the voltage-controlled DC-DC converter disclosed in Japanese Unexamined Patent Publication No. H9-154275, to the noninverting input terminals of the error amplifier ERA1, a reference voltage e1 and the soft-start capacitor CS2 are connected. In response to power-on, the soft-start capacitor CS2 is charged by the constant current circuit I2 so that voltage gradually rises. While the voltage of the soft-start capacitor CS2 is lower than the reference voltage e1, the error amplifier ERA1 differentiates a divided voltage value of an output voltage VOUT with respect to the voltage of the soft-start capacitor CS2 for amplification and outputs the voltage VC.

SUMMARY OF THE INVENTION

In the DC-DC converter according to the above-described background art, irrespective of whether it is a voltage-controlled type or a current-controlled type, at start-up time owing to power-on, a terminal voltage of the soft-start capacitor which is gradually changed by the constant current circuit is provided as a reference voltage, a so-called soft-start operation output, in which the output voltage VOUT gradually rises, is carried out. At start-up time owing to power-on, the terminal voltage of the soft-start capacitor is provided as a reference voltage of the error amplifier, while for a time until a steady operation state, it stands at a voltage lower than the reference voltage e1. It is sufficient to supply a limited electric energy to the output voltage VOUT, and no power supply is necessary in some periods.

However, in the current-controlled DC-DC converter, the MOS transistor FET1 is turned on in every period determined by a frequency of the oscillator OSC100. Power supply is started even in periods where no power supply to the output voltage VOUT is necessary. Furthermore, before the MOS transistor FET1 once turned on is OFF-controlled, a time delay of circuits that compose control of the DC-DC converter is required. During this time, ON state of the MOS transistor FET1 unconditionally continues.

Figure 9:
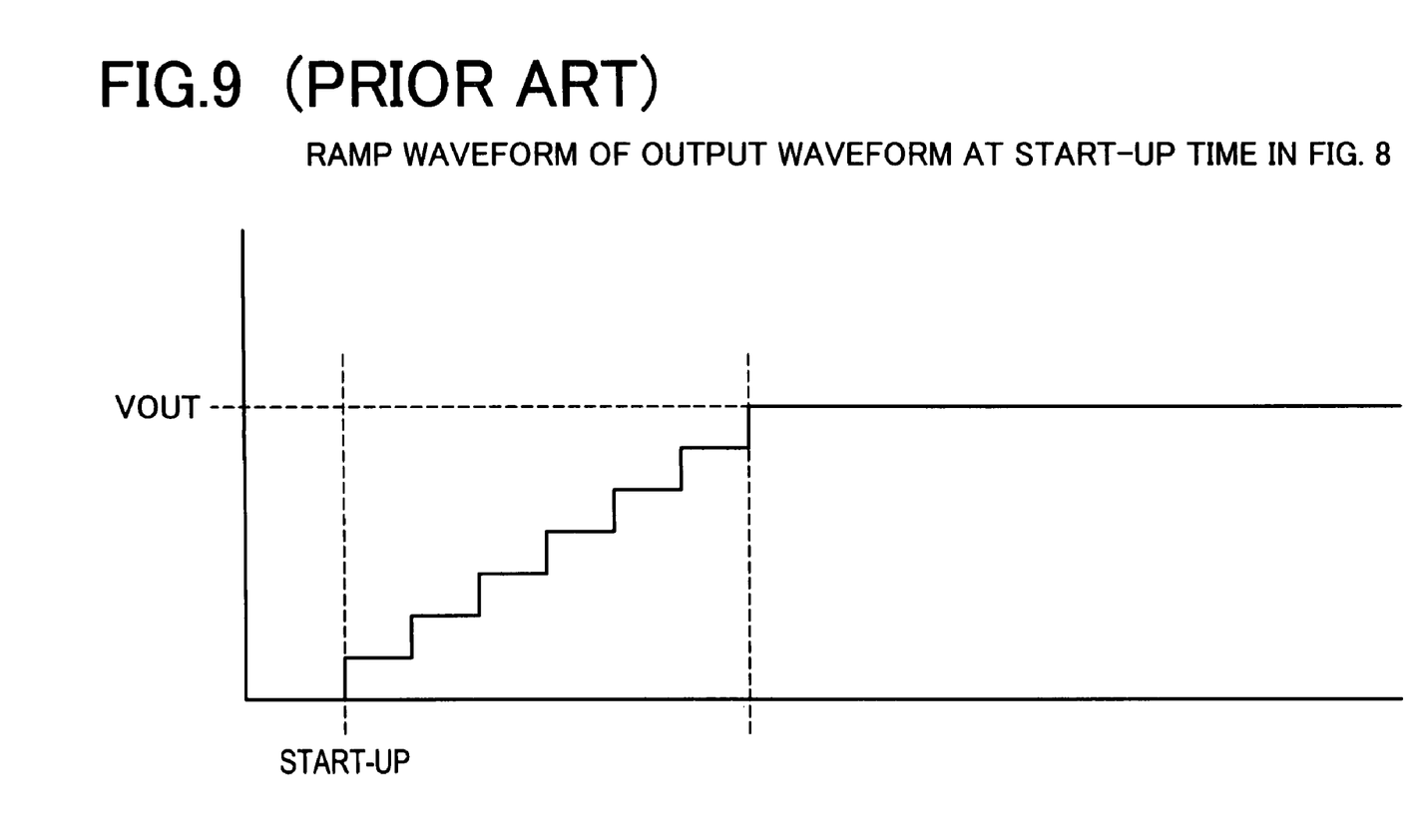
FIG. 9 is a chart showing a ramp waveform of an output waveform at start-up time in FIG. 8.

In particular, when a load of the DC-DC converter is light, a period of time where the output voltage VOUT of the current-controlled DC-DC converter rises beyond a voltage value set by the soft-start capacitor CS2 may occur. An example is shown in FIG. 9. In conduction control of the MOS transistor FET1, by influence of a time delay due to a circuit response from ON control to OFF control in every oscillation period by the oscillator OSC100 and a rise in terminal voltage of the soft-start capacitor CS2, the output voltage VOUT at start-up time may rise stepwise without showing a smooth ramp waveform. Unrealized smooth ramp control of the output voltage VOUT expected by the charging operation of the soft-start capacitor CS2 by the constant current circuit I2 is also a possible problem.

The present invention has been made in view of the above-described background arts, and it is an object of the invention to provide a current-controlled DC-DC converter control circuit, a current-controlled DC-DC converter, and a method for controlling a current-controlled DC-DC converter capable of smoothly carrying out ramp control of an output voltage at any one of power-on time and power-off time or both of a current-controlled DC-DC converter.

To achieve the above object, according to a first aspect of the invention, there is provided a current-controlled DC-DC converter control circuit comprising an oscillation circuit that instructs on timing of periodic switching control of a DC-DC converter, wherein when the switching control is in a transition state between a stop state and a steady operation state, the oscillation circuit gradually increases oscillation frequency in a transition state where an output voltage value of the DC-DC converter rises with elapse of time and gradually decreases oscillation frequency in a transition state where an output voltage value of the DC-DC converter falls with elapse of time.

In addition, according to a second aspect of the invention, there is provided a current-controlled DC-DC converter comprising an oscillation circuit that instructs on timing of periodic switching control, wherein when the switching control is in a transition state between a stop state and a steady operation state, the oscillation circuit gradually increases oscillation frequency in a transition state where an output voltage value of the DC-DC converter rises with elapse of time and gradually decreases oscillation frequency in a transition state where an output voltage value of the DC-DC converter falls with elapse of time.

According to the current-controlled DC-DC converter control circuit and current-controlled DC-DC converter of the present invention, the DC-DC converter is switching-controlled by the oscillation circuit with periodic timing. When the switching control is in a transition state between a stop state and a steady operation state, the oscillarion frequency of the oscillation circuit gradually increases in a transition state where an output voltage value of the DC-DC converter rises with elapse of time and gradually decreases in a transition state where an output voltage value of the DC-DC converter falls with elapse of time.

Furthermore, according to a third aspect of the invention, there is provided a method for controlling a current-controlled DC-DC converter by which periodic switching control is carried out, comprising the steps of:

carrying out switching control with a first period in a steady operating state, and when the switching control is in a transition state between a stop state and a steady operation state, gradually increasing oscillation period, with the first period as a shortest period, in a transition state where an output voltage value of the DC-DC converter rises with elapse of time, and gradually decreasing oscillation period, with the first period as a shortest period, in a transition state where an output voltage value of the DC-DC converter falls with elapse of time.

According to the method for controlling a current-controlled DC-DC converter of the present invention, for the DC-DC converter, periodic switching control is carried out. In a steady operating state, switching control is carried out with a first period, and when a transition state between a stop state and a steady operation state, oscillation period is gradually increased with the first period as a shortest period in a transition state where an output voltage value of the DC-DC converter rises with elapse of time, and oscillation period gradually decreases with the first period as a shortest period in a transition state where an output voltage value of the DC-DC converter falls with elapse of time.

Consequently, the oscillation frequency of the oscillation circuit gradually rises in the process that the output voltage gradually rises upon a start instruction or/and the oscillation frequency gradually falls in the process that the output voltage gradually falls upon a stop instruction, therefore, when the DC-DC converter is in a transition state between a stop state and a steady operation state, a time interval of the switching control can be extended.

In the transition duration of the output voltage owing to a start instruction or a stop instruction, even when the switching control is carried out in every period of the oscillation circuit, no excess electric power is supplied to the output voltage, therefore, the output voltage can be made to have a smooth ramp waveform.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, embodiments of a current-controlled DC-DC converter control circuit, a current-controlled DC-DC converter, and a control method thereof will be described in detail based on FIG. 1 to FIG. 6 with reference to the drawings.

Figure 1:
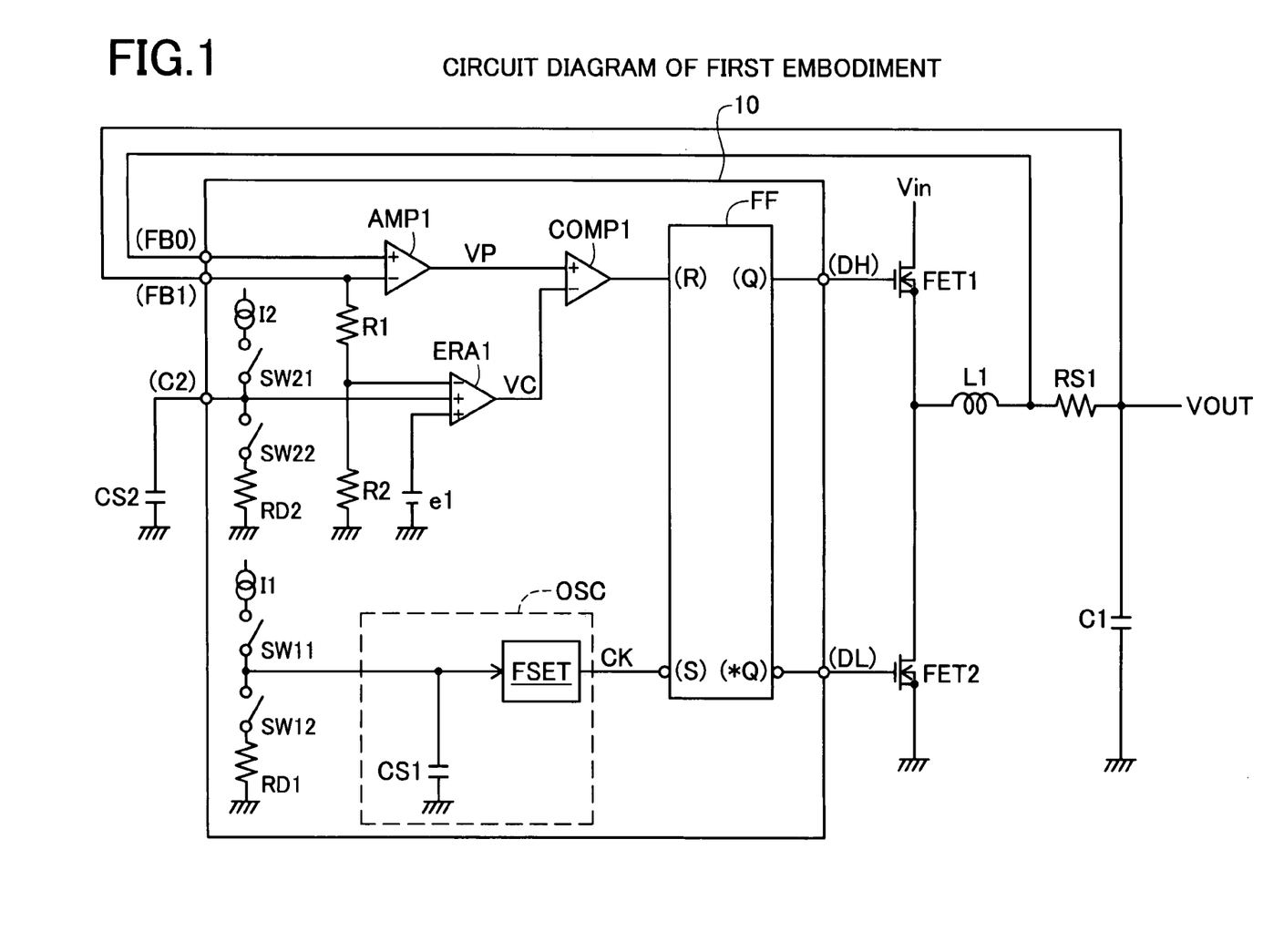
FIG. 1 is a circuit diagram of a first embodiment.

FIG. 1 is a circuit diagram showing a current-controlled DC-DC converter according to a first embodiment. This is a step-down configuration. In addition, it has a circuit configuration of a synchronous rectification system.

A drain terminal of a MOS transistor FET1 being a main switching element is inputted with an input voltage VIN, and a source terminal is connected to an input terminal of a choke coil L1 and a drain terminal of a MOS transistor FET2 being a synchronous rectification switching element. A source terminal of the MOS transistor FET2 is connected to a ground potential. In addition, a gate terminal of the MOS transistor FET1 is connected to an output terminal (DH) of a control circuit 10, and a gate terminal of the MOS transistor FET2 is connected to an output terminal (DL) of the control circuit 10. An output terminal of the choke coil L1 is connected to an input terminal of a current measuring resistance RS1 and an input terminal (FB0) of the control circuit 10. An output terminal of the current measuring resistance RS1 is connected to a smoothing capacitor C1 and is provided as an output terminal VOUT of the DC-DC converter. The other terminal of the smoothing capacitor C1 is connected to a ground potential. In addition, the output terminal VOUT is connected to an input terminal (FB1) of the control circuit 10.

The control circuit 10 is a circuit that carries out control to make a step-down converter that operates by a synchronous rectification system by switching control of the MOS transistors FET1 and FET2 operate in a circuit-controlled type. The output voltage VOUT of the DC-DC converter is divided by an input resistance R1 and a grounding resistance R2 connected in series between the input terminal (FB1) and a ground potential and is inputted into noninverting input terminals of an error amplifier ERA1. The first noninverting input terminal of the error amplifier ERA1 is inputted with a reference voltage e1 from a ground potential, and to the second noninverting input terminal, a soft-start capacitance element CS2 is connected via a soft-start terminal (C2). An output voltage VC of the error amplifier ERA1 is inputted into an inverting input terminal of a voltage comparator COMP1.

The input terminals (FB1) and (FB0) are connected to an inverting input terminal and a noninverting input terminal of a voltage amplifier AMP1 respectively. An output voltage VP of the voltage amplifier AMP1 is inputted into a noninverting input terminal of the voltage comparator COMP1. An output terminal of the voltage comparator COMP1 is connected to a reset terminal (R) of a flip-flop circuit FF.

A set terminal (S) of the flip-flop circuit FF is inputted with an oscillation signal CK outputted from an oscillation circuit OSC described later. A noninverting output terminal (Q) of the flip-flop circuit FF is connected to the output terminal (DH) of the control circuit, and an inverting output terminal (*Q) is connected to the output terminal (DL) of the control circuit 10. Here, the set terminal (S) of the flip-flop circuit FF is triggered by a low-level signal input, and the reset terminal (R) is triggered by a high-level signal input.

A switching circuit SW21 is a circuit that connects a constant current circuit I2 to the soft-start capacitance element CS2 via the soft-start terminal (C2). Electric current is conducted therethrough in response to a start instruction (unillustrated), and this has been made non-conductive at, at least, a point in time where a stop instruction (unillustrated) is issued. In addition, a switching circuit SW22 is a circuit that connects a discharging resistance element RD2 to the soft-start capacitance element CS2 via the soft-start terminal (C2). Electric current is conducted therethrough in response to a stop instruction, and this has been made non-conductive at, at least, a point in time where a start instruction is issued.

The oscillation circuit OSC comprises a frequency setting section FSET and a capacitance element CS1. The capacitance element CS1 is provided between a ground potential land and a control input terminal of the frequency setting section FSET. For the frequency setting section FSET, an oscillation frequency is set according to a terminal voltage of the capacitance element CS1 inputted into the control input terminal, and the oscillation signal CK is outputted.

The capacitance element CS1 is charged and discharged by a circuit configuration similar to a charge/discharge circuit for the soft-start capacitance element CS2. Namely, a switching circuit SW11 is a circuit that connects a constant current circuit I1 to the capacitance element CS1. Electric current is conducted therethrough in response to a start instruction (unillustrated), and this has been made non-conductive at, at least, a point in time where a stop instruction (unillustrated) is issued. By conduction of the switching circuit SW11, a current pathway (charging pathway) to the capacitance element CS1 is established. In addition, a switching circuit SW12 is a circuit that connects a discharging resistance element RD1 to the capacitance element CS1. Electric current is conducted therethrough in response to a stop instruction, and this has been made non-conductive at, at least, a point in time where a start instruction is issued. By conduction of the switching circuit SW12, a current pathway (discharging pathway) from the capacitance element CS1 is established.

Here, the capacitance element CS1 is an example of a first capacitance element. In addition, the constant current circuit I1 is an example of a first current section and a charging current section, and the resistance elements are examples of second current sections and discharging current sections. The switching circuit SW11 is an example of a first switching circuit, and the switching circuit SW12 is an example of a second switching circuit.

The oscillation circuit OSC outputs the oscillation signal CK at a predetermined oscillation frequency so as to set the flip-flop circuit FF. In response to the setting of the flip-flop circuit FF, the noninverting output terminal (Q) becomes high level and the inverting output terminal (*Q) becomes low level. These make the MOS transistor FET1 conductive and the MOS transistor FET2 non-conductive via the output terminals (DH) and (DL), respectively.

The error amplifier ERA1 error-amplifies a difference between a voltage obtained by dividing the output voltage VOUT by the input resistance R1 and grounding resistance R2, which is inputted into the inverting input terminal and a reference voltage, or a lower voltage level of the voltages inputted into the two noninverting input terminals, and outputs the voltage VC. The voltage amplifier AMP1 outputs a voltage VP obtained by amplifying a voltage drop caused by a current that flows to the current measuring resistance RS1. The voltages VC and VP are inputted into the inverting input terminal and noninverting input terminal of the voltage comparator COMP1, respectively. The voltage comparator COMP1 resets the flip-flop circuit FF as a result of the voltage VP reaching the voltage VC. In response to the resetting of the flip-flop circuit FF, the noninverting output terminal (Q) becomes low level and the inverting output terminal (*Q) becomes high level. These make the MOS transistor FET1 non-conductive and the MOS transistor FET2 conductive via the output terminals (DH) and (DL), respectively. A voltage level of the voltage VC is determined according to an error voltage of signals inputted into the error amplifier ERA1. Therefore, the more the divided voltage is low level relative to the reference voltage, the larger a peak current value of a coil current is controlled, and the peak current value becomes smaller as the divided voltage approximates the reference voltage.

When the DC-DC converter is started, the switching circuit SW21 is made conductive so that the soft-start capacitance element CS2 starts to be charged by the constant current circuit I2. At the initial stage of charge of the soft-start capacitance element CS2, a terminal voltage of the soft-start capacitance element CS2 is at a lower level than the reference voltage e1. Therefore, the error amplifier ERA1 carries out error amplification of the divided voltage with respect to the terminal voltage of the soft-start capacitance element CS2. Since the soft-start capacitance element CS2 is gradually charged by the constant voltage circuit I2, the terminal voltage gradually rises to a high voltage level. The error amplifier ERA1 error-amplifies the divided voltage with respect to the gradually rising terminal voltage. Control by which the output voltage VOUT gradually rises according to the terminal voltage of the soft-start capacitance element CS2 is thus carried out. This is a soft-start operation.

When the terminal voltage of the soft-start capacitance element CS2 exceeds the reference voltage e1 in voltage level, the error amplifier ERA1 error-amplifies the divided voltage with respect to the reference voltage e1. The output voltage VOUT is thus controlled according to the reference voltage e1.

When the DC-DC converter is stopped, the switching circuit SW22 is made conductive so that the soft-start capacitance element CS2 is discharged via the discharging resistance element RD2. At the initial stage of discharge of the soft-start capacitance element CS2, the terminal voltage of the soft-start capacitance element CS2 is at a higher level than the reference voltage e1. The error amplifier ERA1 error-amplifies the divided voltage with respect to the reference voltage e1 so as to maintain the output voltage VOUT at a fixed voltage level according to the reference voltage e1. A terminal voltage gradually falls lower than the reference voltage e1 when the soft-start capacitance element CS2 is further discharged. The error amplifier ERA1 error-amplifies the divided voltage with respect to the gradually falling terminal voltage. Control for which the output voltage VOUT gradually falls according to the terminal voltage of the soft-start capacitance element CS2 is thus carried out.

In the MOS transistors FET1 and FET2, setting and resetting of the flip-flop circuit FF repeat a conductive state and a non-conductive state. Since the flip-flop circuit FF is set by the oscillation signal CK, periods of the conductive state and non-conductive state are determined by the oscillation frequency of the oscillation signal CK outputted from the oscillation circuit OSC. As described later, according to the first embodiment, the oscillation frequency is gradually increased and decreased for a transition duration of the output voltage VOUT in voltage level owing to a start-up or a stop of the DC-DC converter.

Figure 2:
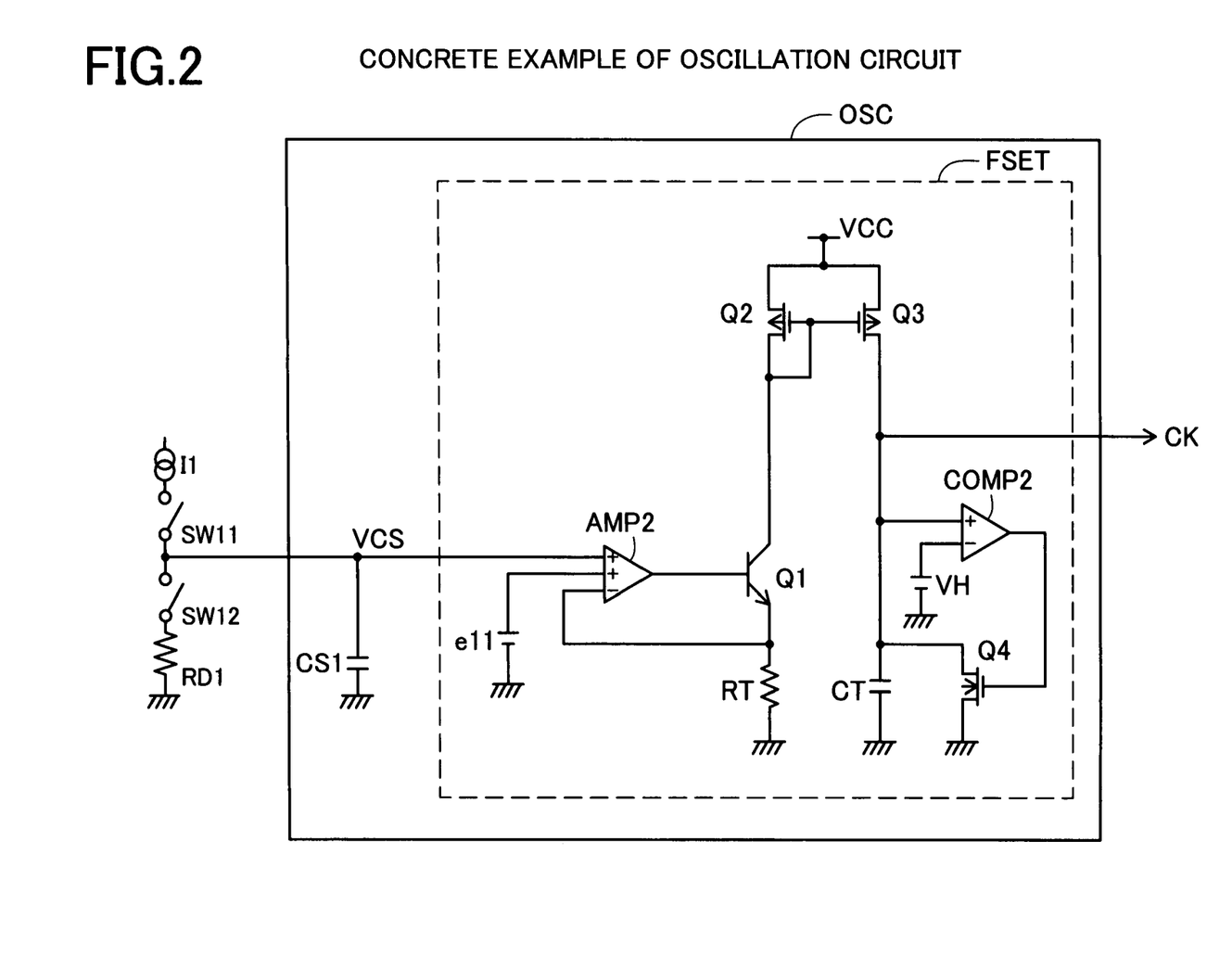
FIG. 2 is a concrete example of an oscillation circuit.

A concrete example of the oscillation circuit OSC is shown in FIG. 2. A sawtooth wave is outputted as the oscillation signal CK. The frequency setting section FSET has the following configuration. An output terminal of a voltage amplifier AMP2 comprising a first noninverting input terminal into which a terminal voltage VCS of the capacitance element CS1 is inputted and a second noninverting input terminal into which a steady setting voltage e11 is inputted is connected to a base terminal of a transistor Q1. An emitter terminal of the transistor Q1 is connected to one end of a current setting resistance element RT and is connected to an inverting input terminal of the voltage amplifier AMP2. The other end of the current setting resistance element RT is connected to a ground potential.

The voltage amplifier AMP2 and transistor Q1 are formed as an example of a buffer section, and the current setting resistance element RT is an example of a current setting section. An emitter terminal of the transistor Q1 being an output of the buffer section is controlled to be a lower voltage level of the first and second noninverting input terminals and is applied to the current setting resistance element RT being a current setting section, whereby a predetermined bias current flows to the transistor Q1.

A collector terminal of the transistor Q1 is connected to a drain terminal and a gate terminal of a transistor Q2, and is further connected to a gate terminal of a transistor Q3. A power supply voltage VCC is supplied to source terminals of the transistors Q2 and Q3. The transistors Q2 and Q3 compose a current mirror circuit. The bias current set by the current setting resistance element RT is outputted from the transistor Q3 by the current mirror circuit.

A drain terminal of the transistor Q3 is connected to the other end of a frequency setting capacitance element CT whose one end is connected to a ground potential and is provided as an output terminal CK. The output terminal CK is connected to a noninverting input terminal of a voltage comparator COMP2. An inverting input terminal of the voltage comparator COMP2 is inputted with a peak voltage VH of an oscillation signal CK. An output terminal of the voltage comparator COMP2 is connected to a gate terminal of a transistor Q4. The transistor Q4 is connected between the output terminal and a ground potential. The oscillation signal CK is outputted from the output terminal.

The buffer section exemplified with the voltage amplifier AMP2 and transistor Q1 controls voltage inputted into the inverting input terminal of the voltage amplifier AMP2 so as to be a lower one of the voltages applied to the two noninverting input terminals.

Namely, while using a lower one of the voltages applied to the two noninverting input terminals as a reference voltage, the voltage amplifier AMP2 amplifies a difference between the reference voltage and voltage applied to the current setting resistance element RT and outputs the same to the base of the transistor Q1. Since the applied voltage to the current setting resistance element RT is dependent on the bias current that flows to the current setting resistance element RT, when the applied voltage is low as the current that flows to the current setting resistance element RT is small, output voltage of the voltage amplifier AMP2 rises to increase a base current of the transistor Q1. When the base current of the transistor Q1 is increased, an emitter current of the transistor Q1 is also increased so that the current that flows to the current setting resistance element RT is increased. On the other hand, when the applied voltage is high as the current that flows to the current setting resistance element RT is large, output voltage of the voltage amplifier AMP2 decreases to reduce a base current of the transistor Q1. When the base current of the transistor Q1 is reduced, an emitter current of the transistor Q1 is also reduced so that the current that flows to the current setting resistance element RT is reduced. Consequently, the voltage applied to the current setting resistance element RT coincides with the reference voltage.

Figure 3:
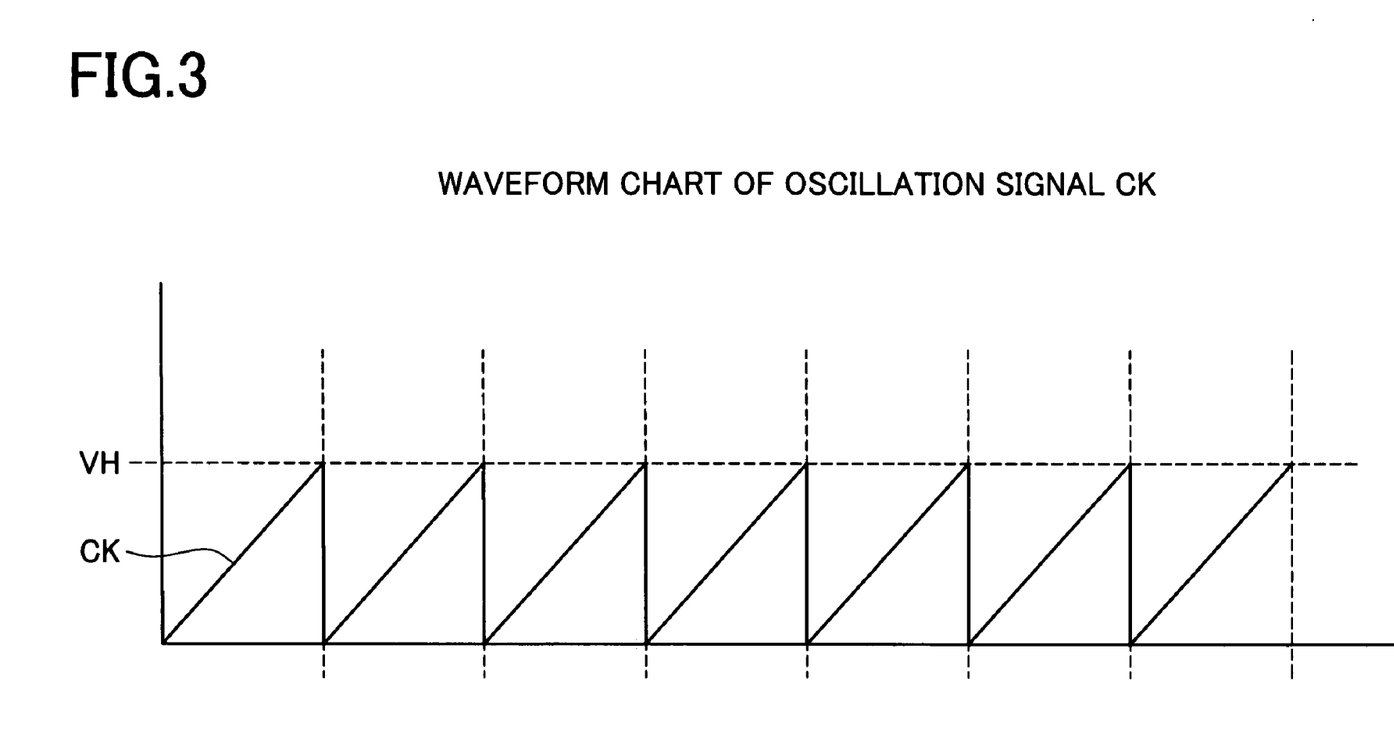
FIG. 3 is a waveform chart of an oscillation signal CK.
Figure 4:
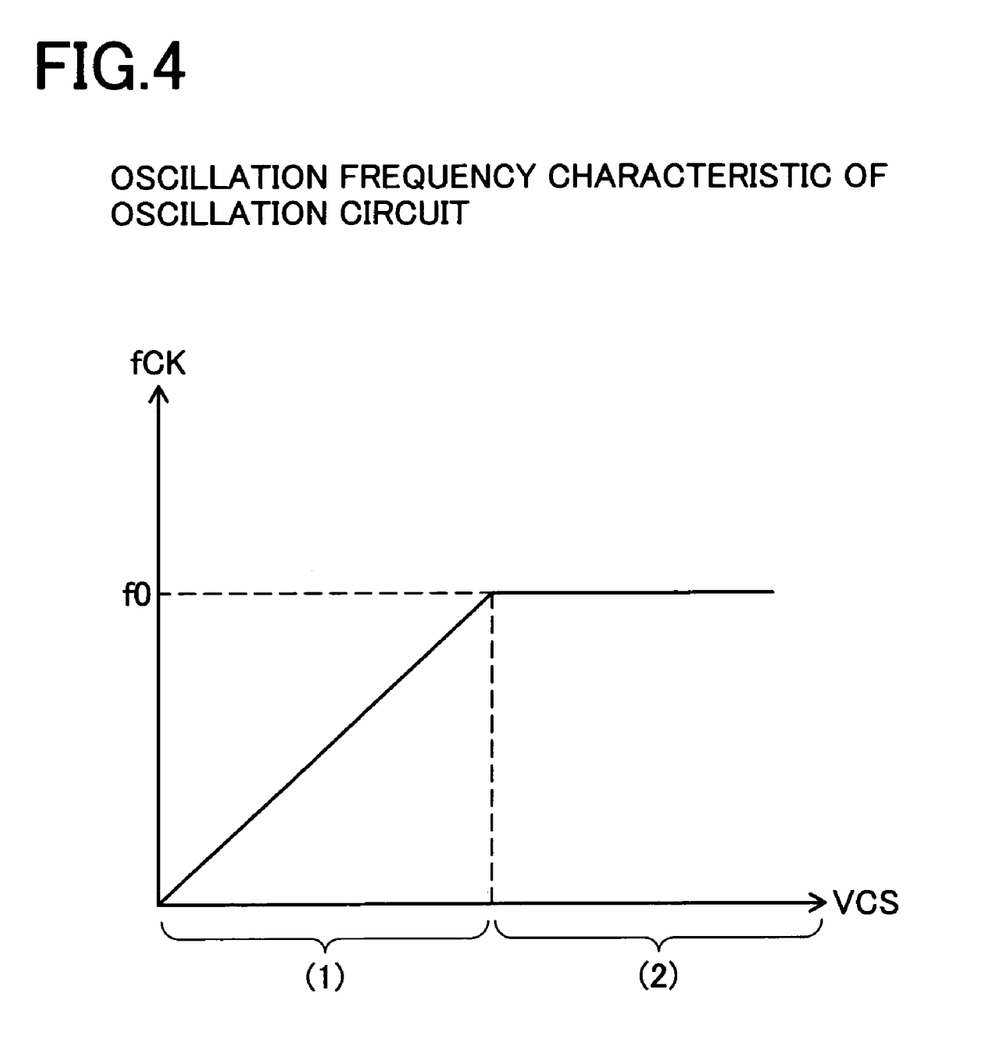
FIG. 4 is a chart showing an oscillation frequency characteristic of an oscillation circuit.

The bias current is determined based on the voltage applied to the current setting resistance element RT. The bias current flows to the current mirror circuit composed of the transistors Q2 and Q3 via the transistor Q1, and is outputted from the transistor Q3. The outputted bias current charges the frequency setting capacitance element CT and thereby raises the voltage level of the output terminal with time. Since the bias current is maintained at a predetermined current value in a steady operation state, the oscillation signal CK has a waveform that linearly increases at a predetermined tilt. Owing to the voltage comparator COMP2, the voltage value of the output terminal reaches the peak voltage VH, whereby the transistor Q4 is made conductive to draw out the output terminal to the ground potential. When the output terminal is drawn out to the ground potential, since the output voltage of the voltage comparator COMP2 is inverted to make the transistor Q4 non-conductive, charge of the frequency setting capacitance element CT with the bias current is again started. By repeating the same, the oscillation signal CK is outputted. The oscillation signal CK outputted from the output terminal has a sawtooth waveform, as shown in FIG. 3. Here, the oscillation frequency of the oscillation signal CK becomes a frequency proportional to the bias current since the capacitance value of the frequency setting capacitance element CT and peak voltage VH of the oscillation signal CK are both fixed. In a steady operation state, a waveform to oscillate with a fixed oscillation frequency is obtained.

When the DC-DC converter is started, the switching circuit SW11 is made conductive so that the capacitance element CS1 is started to be charged by the constant current circuit I1. At the initial state of charge of the capacitance element CS1, the terminal voltage VCS of the capacitance element CS1 is at a lower voltage level than the steady setting voltage e11.

Therefore, the buffer section applies the terminal voltage VCS to the current setting resistance element RT.

Since the capacitance element CS1 is gradually charged by the constant voltage circuit I1, the terminal voltage VCS gradually rises to a high voltage level. By the voltage amplifier AMP2 and transistor Q1, an almost identical voltage is applied to the current setting resistance element RT according to the gradually rising terminal voltage VCS. As a result of the charging operation for the capacitance element CS1 owing to the start-up, the applied voltage to the current setting resistance element RT gradually increases and the bias current gradually increases. Accordingly, the oscillation frequency of the oscillation signal CK gradually increases owing to an elapse of time after the start instruction. In an oscillation frequency characteristic shown in FIG. 4, the oscillarion frequency shifts in an increasing direction in the region (1).

When the terminal voltage VCS exceeds the voltage level of the steady setting voltage e11, the applied voltage to the current setting element RT is maintained at the steady setting voltage e11. Thereby, in a steady operation state, the bias current has a current value according to the steady setting voltage e11. Accordingly, the oscillation frequency of the oscillation signal CK is fixed. In the oscillation frequency shown in FIG. 4, it has a frequency f0 being in the region (2). In this connection, the oscillation period with the frequency f0 is an example of a first period.

When the operation of the DC-DC converter is stopped, the switching circuit SW12 is made conductive so that the capacitance element CS1 starts to be discharged via the discharging resistance element RD1. At the initial stage of discharge of the capacitance element CS1, the terminal voltage VCS is at a higher level than the steady setting voltage e11. The voltage applied to the current setting resistance element RT is maintained at the constant set voltage e11. The bias current has a fixed current value the same as that in the steady operation state. Accordingly, the oscillation frequency of the oscillation signal CK has, in the oscillation frequency characteristic shown in FIG. 4, the frequency f0 being in the region (2).

When the capacitance element CS1 is further discharged, the terminal voltage VCS gradually falls lower than the steady setting voltage e11. An almost identical voltage is applied to the current setting resistance element RT according to the gradually falling terminal voltage VCS. The applied voltage to the current setting resistance element RT gradually falls and the bias current gradually falls. Accordingly, the oscillation frequency of the oscillation signal CK gradually decreases owing to an elapse of time after the stop instruction. In the oscillation frequency characteristic shown in FIG. 4, the oscillation frequency shifts in a decreasing direction in the region (1).

In the control circuit 10 of the DC-DC converter according to the first embodiment, owing to a start instruction, the oscillation frequency of the oscillation signal CK outputted from the oscillation circuit OSC gradually increases. Similarly, owing to a stop instruction, the oscillation frequency of the oscillation signal CK outputted from the oscillation circuit OSC gradually decreases. Thereby, current-controlled type control is carried out in the DC-DC converter, and even when the flip-flop circuit FF is set in every period of the oscillation signal CK and the MOS transistor FET1 is brought in a conductive state, a time interval between setting operations can be extended in a predetermined period after a start/stop instruction to the DC-DC converter. This suppresses an excessive repetition of the setting operations during a transition duration so that an unnecessary electrode supply is suppressed, therefore, a smooth transition of the output voltage VOUT can be realized.

In the first embodiment, since the dedicated capacitance circuit I1, resistance element RD1, and switching circuits SW11 and SW12) are provided for setting a frequency of the oscillation signal CK, adjustment to an optimal oscillation frequency transition is possible according to the state of transition of the output voltage VOUT.

Figure 5:
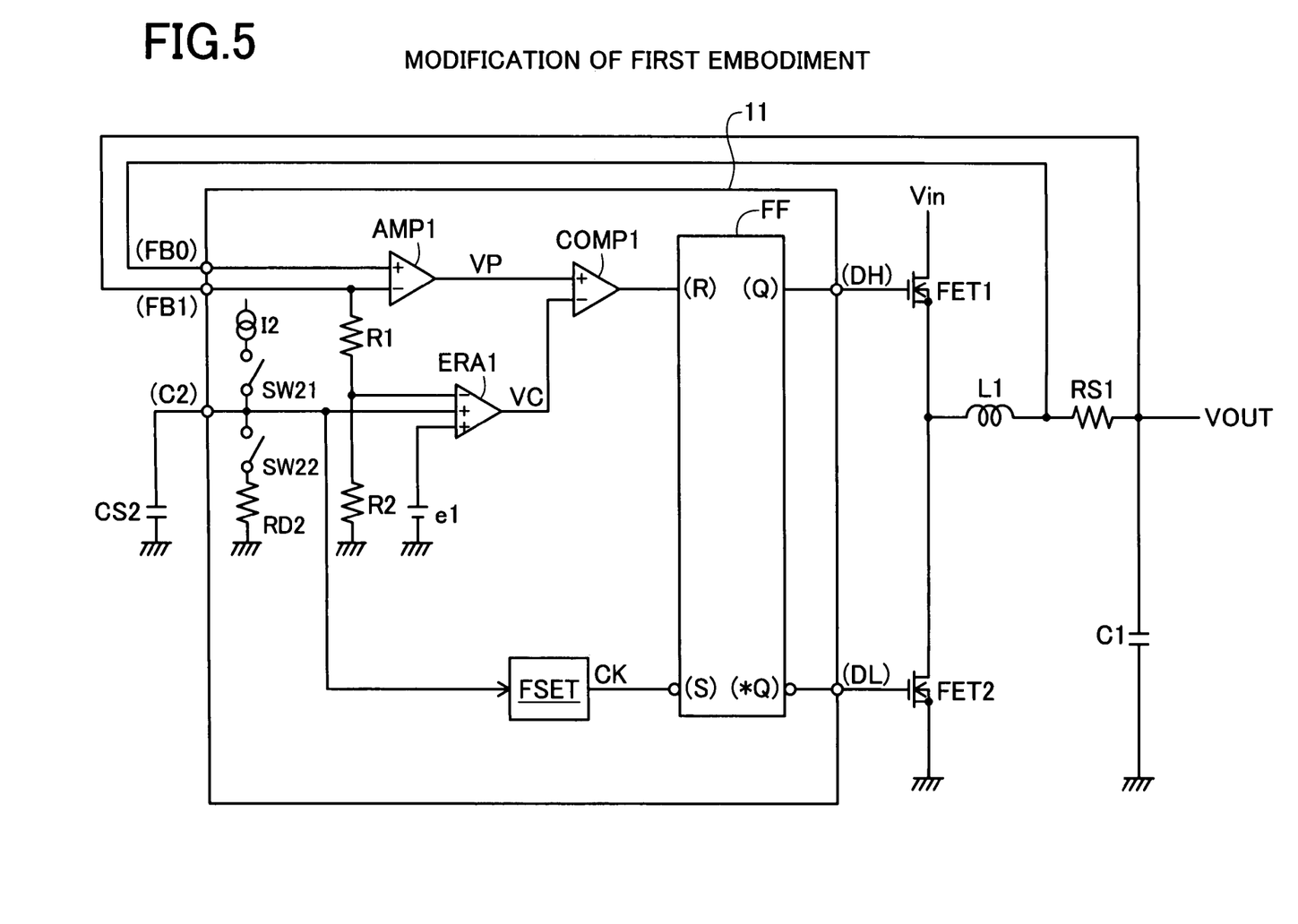
FIG. 5 is a circuit diagram showing a modification of the first embodiment.

FIG. 5 is a modification of the first embodiment. In place of the dedicated capacitance element CS1 and dedicated charge/discharge circuit (constant current circuit I1, resistance element RD1, and switching circuits SW11 and SW12) provided in the first embodiment (FIG. 1), a terminal voltage of a soft-start capacitor CS2 is utilized. A rise of an output voltage VOUT by a start instruction and a fall of an output voltage VOUT by a stop instruction is determined by a terminal voltage obtained by gradually charging and discharging the soft-start capacitance element CS2 is determined. By utilizing the terminal voltage, for an oscillation frequency, a gradual increase in oscillation frequency at a start-up time and a gradual decrease in oscillation frequency at a stop time can be realized.

By substituting the soft-start capacitance element CS2 for control of the oscillation frequency of the oscillation signal CK, the circuit configuration can be reduced for a lower current consumption.

Figure 6:
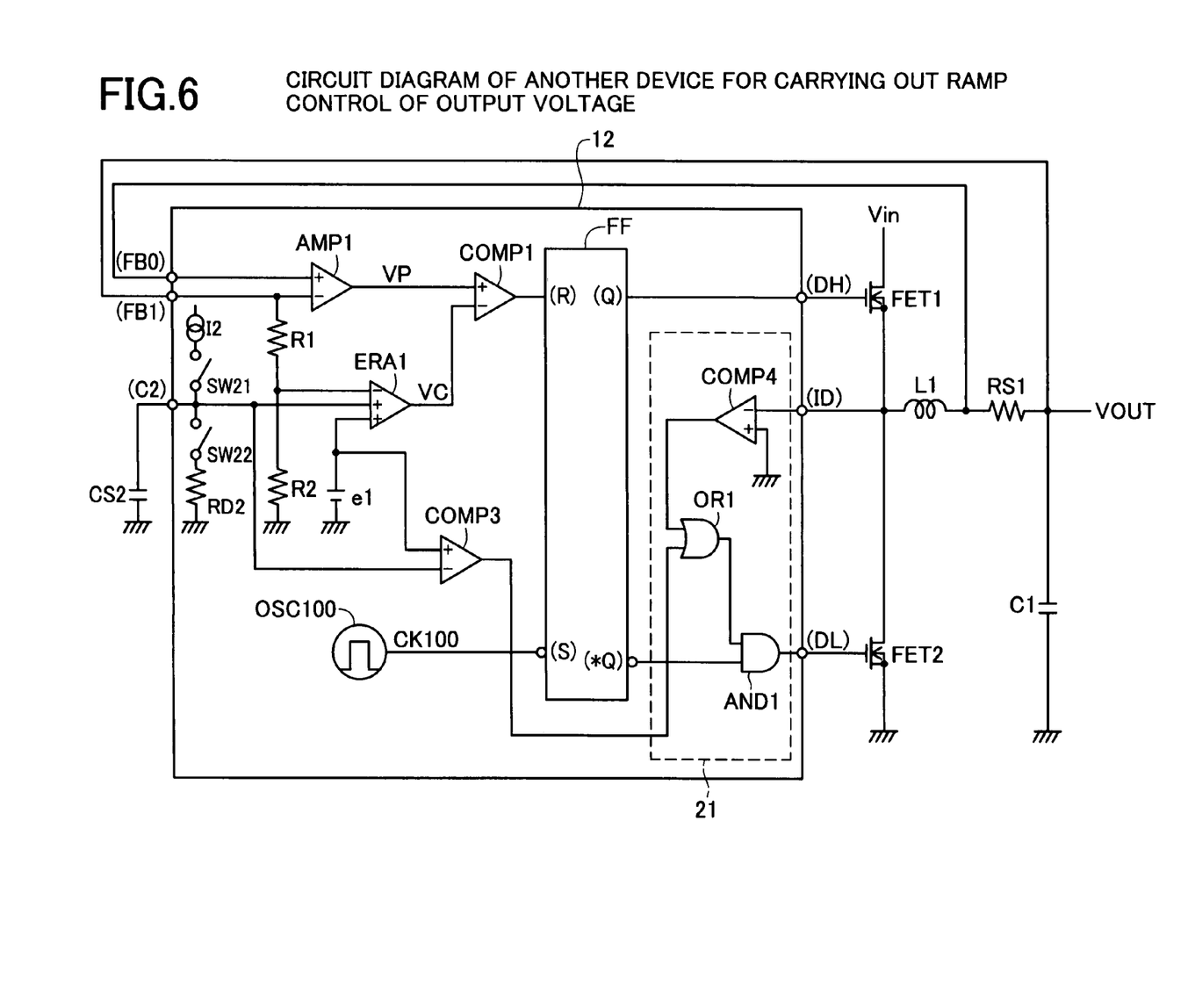
FIG. 6 is a circuit diagram of another device for carrying out ramp control of an output voltage.

FIG. 6 is a circuit example to control voltage transition of an output voltage VOUT, when starting and stopping a current-controlled DC-DC converter by a synchronous rectification system, by permitting a backward flow of electric current in synchronous rectification elements. This is a circuit example to smoothly carry out ramp control of an output voltage VOUT without decreasing oscillation frequency of an oscillation signal CK either at a start-up time or a stop time.

The circuit example of FIG. 6 includes, in addition to the circuit diagram of the background art of FIG. 8, a voltage comparator COMP3 into whose noninverting input terminal the reference voltage e1 is inputted and into whose inverting input terminal the terminal voltage of the soft-start capacitance element CS2 is inputted and a synchronous rectification control circuit 21. Furthermore, it includes a current detection terminal (ID) to which a connection point between the MOS transistors FET1 and FET2 is connected.

A synchronous rectification control circuit 21, for which the current detection terminal (ID) is connected to an inverting input terminal, includes a voltage comparator COMP4 to whose noninverting input terminal a ground potential is connected, an OR gate OR1 into which output signals of the voltage comparators COMP3 and COMP4 are inputted, and an AND gate AND1 into which an output signal of the OR gate OR1 and an output signal from the inverting output terminal (*Q) of the flip-flop circuit FF are inputted. An output terminal of the AND gate AND1 is connected to an output terminal (DL).

The MOS transistor FET2 being a synchronous rectification element is made to conduct electric current when an output signal of the AND gate AND1 is high level. This is a case where two input signals inputted into the AND gate AND1 are both high level. Namely, while at least either one of the output signals of the voltage comparators COMP3 and COMP4 is high level, the flip-flop circuit FF is brought in a reset state so that a high-level signal is outputted from the inverting output terminal (*Q).

Here, the case where the output signal of the comparator COMP3 is high level is when the terminal voltage of the soft-start capacitance element CS2 is at a lower voltage level than the reference voltage e1. This is a transition duration for which the soft-start capacitance element CS2 is being charged or discharged at a start-up time or a stop time of the DC-DC converter.

In addition, the case where the output signal of the comparator COMP4 is high level is when the inverting input terminal is a negative voltage. This is a duration for which the MOS transistor FET2 is conducting electric current as a synchronous rectification element.

For the current-controlled DC-DC converter, the MOS transistor FET1 is forcedly made conductive in every period of an oscillation signal CK100 from the oscillator OSC100, and electric power is unconditionally supplied to the output voltage VOUT from the input voltage VIN. In particular, when the load is light, the output voltage VOUT may excessively rise.

Therefore, by returning the electric power excessively supplied from the input voltage VIN to the output voltage VOUT to the input voltage VIN, ramp control of the output voltage VOUT can be smoothly carried out at a start-up time and a stop time of the DC-DC converter.

For the voltage comparator COMP3, the terminal voltage of the soft-start capacitance element CS2 is lower than the reference voltage e1, and for a transition duration of the output voltage VOUT from a start-up operation to a steady operation state and for a transition duration of the output voltage VOUT from a steady operation state to a stop owing to a stop, and a backward flow of electric current of the MOS transistor FET2 being a synchronous element is permitted.

For a time until the flip-flop circuit FF is reset after being set, energy is charged in the choke coil L1. When the MOS transistor FET1 is made non-conductive, the energy accumulated in the choke coil L1 is discharged to the output side via the MOS transistor FET2. Electric power is supplied to the load, and an electric charge is accumulated in the smoothing capacitor C1, so that the output voltage VOUT rises. When the load connected to the output voltage VOUT is light such as in an unloaded condition, the energy accumulated in the choke coil L1 is all accumulated in the smoothing capacitor C1 and used only for raising the output voltage VOUT. Owing to the shift in energy from the choke coil L1 to the smoothing capacitor C1, the voltage value (output voltage VOUT) of the smoothing capacitor C1 reaches a peak value in a time one fourth of the oscillation frequency determined based on an inductance value of the choke coil L1 and a capacitance value of the smoothing capacitor.

When a backward flow in the MOS transistor FET2 has been permitted, after the voltage of the smoothing capacitor C1 has reached a peak value, after the voltage of the smoothing capacitor C1 has reached the peak value after an elapse of the time one fourth of the oscillation capacity, an electric current starts to flow in a direction opposite the normal synchronous rectification direction, and the energy in the smoothing capacitor C1 starts to return to the choke coil L1. Thereafter, when the MOS transistor FET2 is made non-conductive, the energy accumulated in the choke coil L1 is returned to the input voltage VIN via a body diode of the MOS transistor FET1. Thereby, the excessively supplied energy can be returned to the input voltage VIN. Even when the load of the DC-DC converter is light, the output voltage VOUT of the DC-DC converter never unnecessarily rises, and it becomes possible to carry out control for a smooth transition of the output voltage VOUT.

As has been described in the above in detail, according to the control circuit 10 of the current-controlled DC-DC converter of the present embodiment, the MOS transistor FET1 being a main switching element of the DC-DC converter is switching-controlled by the flip-flop circuit FF. The oscillation circuit OSC is connected to the set terminal (S) of the flip-flop circuit FF, and the flip-flop circuit FF is set in every period of the oscillation signal CK so that the MOS transistor FET1 is brought in a conductive state. For the oscillation signal CK outputted from the oscillation circuit OSC, when the DC-DC converter is in a transition state between a stop state and a steady operation state, the oscillation frequency gradually increases and decreases in accordance with an increase and decrease in the voltage value of the output voltage VOUT of the DC-DC converter.

In addition, according to a control method of the current-controlled DC-DC converter of the present embodiment, the MOS transistor FET1 being a main switching element of the DC-DC converter is set into a conductive state in every predetermined period. In a steady operation state, the predetermined period is provided at a frequency f0 being a first period, and in a transition state between a steady operation state and a stop state, the predetermined period gradually increases and decreases, with the first period (frequency f0) as a shortest period, in accordance with an increase and decrease in the voltage value of the output voltage VOUT of the DC-DC converter.

Even by control of a current-controlled type in which the MOS transistor FET1 is set into a conductive state in every period of the oscillation signal CK, the oscillation frequency of the oscillation signal CK gradually rises in the process that the output voltage VOUT gradually rises upon a start instruction or/and the oscillation frequency of the oscillation signal CK gradually falls in the process that the output voltage VOUT gradually falls upon a stop instruction, therefore, when the DC-DC converter is in a transition state between a stop state and a steady operation state, a time interval at which the MOS transistor FET1 is set into a conductive state can be extended. No excess electric power is supplied to the output voltage VOUT, therefore, the output voltage VOUT can be made to have a smooth ramp waveform.

It should be noted that the present invention is by no means limited to the foregoing embodiment, and as a matter of course, various improvements and modifications can be made to the invention without departing from the scope and spirit thereof.

For example, in the present embodiment, a description has been given of a case where the oscillation circuit OSC is constructed with the capacitance element CS1, however, a capacitance terminal can be provided so as to externally provide a capacitance element. By externally providing a capacitance element, a gradual increase and decrease in oscillation frequency of the oscillation signal CK can be freely adjusted. In this case, in place of externally providing a capacitance element, it is also possible to directly input control voltage from an external control circuit or the like.

In addition, although a description has been given of a case where the constant current circuit I1 is provided as a charging current section and the discharging resistance element RD1 is provided as a charging current section to charge/discharge the capacitance element CS1, the present invention is not limited hereto. It can be constructed with a resistance element in place of the constant current circuit I1 or together with the constant current circuit I1 and a constant current circuit in place of the constant current circuit I1 or together with the constant current circuit I1.

According to the present invention, it becomes possible to provide a DC-DC converter control circuit that controls output voltage of a current-controlled DC-DC converter at power-on or/and power-off of the DC-DC converter so as to have a smooth ramp waveform, and a control method thereof.

What is claimed is:

1. A current-controlled DC-DC converter control circuit comprising an oscillation circuit that instructs on timing of periodic switching control of a DC-DC converter, wherein when the switching control is in a transition state between a stop state and a steady operation state, the oscillation circuit gradually increases oscillation frequency in a transition state where an output voltage value of the DC-DC converter rises with elapse of time and gradually decreases oscillation frequency in a transition state where an output voltage value of the DC-DC converter falls with elapse of time.

2. The current-controlled DC-DC converter control circuit according to claim 1, comprising a flip-flop circuit that controls main switching element of the DC-DC converter by switching, wherein an oscillation signal outputted from the oscillation circuit is inputted into a set terminal of the flip-flop circuit.

3. The current-controlled DC-DC converter control circuit according to claim 1, comprising a control terminal into which a voltage signal by which terminal voltage gradually rises according to a start instruction and the terminal voltage gradually falls according to a stop instruction is inputted, and a frequency setting section that sets an oscillation frequency of the oscillation circuit according to the terminal voltage of the control terminal.

4. The current-controlled DC-DC converter control circuit according to claim 3, comprising:

a first current section that outputs electric current to the control terminal;

a first switching circuit that establishes a current path to the circuit terminal via the first current section according to the start instruction;

a second current section that draws electric current from the control terminal; and a second switching circuit that establishes a current path to the circuit terminal via the second current section according to the stop instruction.

5. The current-controlled DC-DC converter control circuit according to claim 4, wherein any one of the first current section and the second current section or both comprise any one of a constant current circuit and a resistance element or both.

6. The current-controlled DC-DC converter control circuit according to claim 3, wherein the frequency setting section comprises a buffer section that outputs a voltage according to the terminal voltage of the control terminal, and a current setting section that sets a bias current according to the output voltage of the buffer section.

7. The current-controlled DC-DC converter control circuit according to claim 6, wherein the buffer section comprises a first noninverting input terminal into which the terminal voltage of the control terminal is inputted, and a second noninverting input terminal into which a steady setting voltage to set an oscillation frequency in the steady operation state is inputted, and the buffer section outputs a lower voltage value of the voltages inputted into the first and second noninverting input terminals.

8. The current-controlled DC-DC converter control circuit according to claim 1, wherein the oscillation circuit comprises a first capacitance element in which terminal voltage gradually rises by being gradually charged according to a start instruction and the terminal voltage gradually falls by being gradually discharged according to a stop instruction, and a frequency setting section that sets an oscillation frequency according to the terminal voltage of the first capacitance element.

9. The current-controlled DC-DC converter control circuit according to claim 8, comprising:

a charging current section that charges the first capacitance element;

a first switching circuit that establishes a charging path to the first capacitance element via the charging current section according to the start instruction;

a discharging current section that discharges the first capacitance element; and a second switching circuit that establishes a discharging path from the first capacitance circuit via the discharging current section according to the stop instruction.

10. The current-controlled DC-DC converter control circuit according to claim 9, wherein any one of the charging current section and the discharging current section or both comprise any one of a constant current circuit and a resistance element or both.

11. The current-controlled DC-DC converter control circuit according to claim 8, wherein the frequency setting section comprises a buffer section that outputs a voltage according to the terminal voltage of the first capacitance element, and a current setting section that sets a bias current according to the output voltage of the buffer section.

12. The current-controlled DC-DC converter control circuit according to claim 11, wherein the buffer section comprises a first noninverting input terminal into which the terminal voltage of the first capacitance element is inputted, and a second noninverting input terminal into which a steady setting voltage to set an oscillation frequency in the steady operation state is inputted, and the buffer section outputs a lower voltage value of the voltages inputted into the first and second noninverting input terminals.

13. A current-controlled DC-DC converter comprising an oscillation circuit that instructs on timing of periodic switching control, wherein when the switching control is in a transition state between a stop state and a steady operation state, the oscillation circuit gradually increases oscillation frequency in a transition state where an output voltage value of the DC-DC converter rises with elapse of time and gradually decreases oscillation frequency in a transition state where an output voltage value of the DC-DC converter falls with elapse of time.

14. The current-controlled DC-DC converter according to claim 13, comprising:

a main switching element; and a flip-flop circuit that controls the main switching element of the DC-DC converter by switching, wherein an oscillation signal outputted from the oscillation circuit is inputted into a set terminal of the flip-flop circuit.

15. The current-controlled DC-DC converter according to claim 13, wherein the oscillation circuit comprises a first capacitance element in which terminal voltage gradually rises by being gradually charged according to a start instruction and the terminal voltage gradually falls by being gradually discharged according to a stop instruction, and a frequency setting section that sets an oscillation frequency of the oscillation circuit according to the terminal voltage of the control terminal.

16. The current-controlled DC-DC converter according to claim 13, comprising:

a charging current section that charges the first capacitance element;

a first switching circuit that establishes a charging path to the first capacitance element via the charging current section according to the start instruction;

a discharging current section that discharges the first capacitance element; and a second switching circuit that establishes a discharging path from the first capacitance element via the discharging current section according to the stop instruction.

17. The current-controlled DC-DC converter according to claim 16, wherein any one of the charging current section and the discharging current section or both comprise any one of a constant current circuit and a resistance element or both.

18. The current-controlled DC-DC converter according to claim 15, wherein the frequency setting section comprises a buffer section that outputs a voltage according to the terminal voltage of the first capacitance element, and a current setting section that sets a bias current according to the output voltage of the buffer section.

19. The current-controlled DC-DC converter according to claim 18, wherein the buffer section comprises a first noninverting input terminal into which the terminal voltage of the first capacitance element is inputted, and a second noninverting input terminal into which a steady setting voltage to set an oscillation frequency in the steady operation state is inputted, and the buffer section outputs a lower voltage value of the voltages inputted into the first and second noninverting input terminals.

20. A method for controlling a current-controlled DC-DC converter by which periodic switching control is carried out, comprising the steps of:

carrying out switching control with a first period in a steady operating state, and when the switching control is in a transition state between a stop state and a steady operation state, gradually increasing oscillation period, with the first period as a shortest period, in a transition state where an output voltage value of the DC-DC converter rises with elapse of time, and gradually decreasing oscillation period, with the first period as a shortest period, in a transition state where an output voltage value of the DC-DC converter falls with elapse of time.

* * * * *